United States Patent
Kulkarni et al.

(10) Patent No.: US 11,977,858 B2
(45) Date of Patent: May 7, 2024

(54) CENTRALIZED INTAKE AND CAPACITY ASSESSMENT PLATFORM FOR PROJECT PROCESSES, SUCH AS WITH PRODUCT DEVELOPMENT IN TELECOMMUNICATIONS

(71) Applicant: T-Mobile USA, Inc., Bellevue, WA (US)

(72) Inventors: Prashant Kulkarni, Flower Mound, TX (US); Debadrita Roy, Bothell, WA (US); Sreevidya Baladhandapani, Issaquah, WA (US); Sampath Devadiga, Issaquah, WA (US); Yehuda Maor, Plano, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 153 days.

(21) Appl. No.: 17/666,435

(22) Filed: Feb. 7, 2022

(65) Prior Publication Data
US 2023/0252414 A1    Aug. 10, 2023

(51) Int. Cl.
*G06F 8/30*    (2018.01)
*G06F 8/77*    (2018.01)
(Continued)

(52) U.S. Cl.
CPC .................. *G06F 8/30* (2013.01); *G06F 8/77* (2013.01); *G06F 11/3684* (2013.01);
(Continued)

(58) Field of Classification Search
CPC .......... G06F 8/30; G06F 8/77; G06F 11/3684; G06Q 10/103; G06Q 10/101; H04L 67/75; H04L 67/06
See application file for complete search history.

(56) References Cited

U.S. PATENT DOCUMENTS 5,233,513 A    8/1993 Doyle
5,596,502 A    1/1997 Koski et al.
(Continued)

FOREIGN PATENT DOCUMENTS

CN    112116223 A    12/2020
EP    1234260 A2    8/2002
(Continued)

OTHER PUBLICATIONS

Thorsten Merten, "Software Feature Request Detection in Issue Tracking Systems", 2016, IEEE (Year: 2016).*

*Primary Examiner* — Wei Y Zhen
*Assistant Examiner* — Amir Soltanzadeh
(74) *Attorney, Agent, or Firm* — Perkins Coie LLP

(57) ABSTRACT

A method performed by a platform for real-time intake capacity assessment of a project includes routing, to a service desk, a request to assess capacity for the project. In response, an electronic message is communicated with a link to a form to retrieve structured information about the project. An assessment template is populated with structured information that includes feature-level information of the project (e.g., a level-of-effort (LOE) for developing a software product). The platform can dynamically estimate a capacity measure for the project, which is then used to generate a visualization on a dashboard based on the estimate of the capacity measure. As such, the platform enables better decision-making, planning, and prioritization.

20 Claims, 8 Drawing Sheets

(51) Int. Cl.
  *G06F 11/36* (2006.01)
  *G06Q 10/10* (2023.01)
  *G06Q 10/101* (2023.01)
  *H04L 67/63* (2022.01)
  *H04L 67/75* (2022.01)

(52) U.S. Cl.
  CPC ......... *G06Q 10/101* (2013.01); *G06Q 10/103* (2013.01); *H04L 67/63* (2022.05); *H04L 67/75* (2022.05)

(56) References Cited

U.S. PATENT DOCUMENTS

| | | | |
|---|---|---|---|
| 6,038,517 | A | 3/2000 | Dobbins et al. |
| 6,044,354 | A | 3/2000 | Asplen |
| 6,411,936 | B1 | 6/2002 | Sanders |
| 6,490,569 | B1 | 12/2002 | Grune et al. |
| 6,529,889 | B1 | 3/2003 | Bromberg et al. |
| 6,808,392 | B1 | 10/2004 | Walton |
| 6,895,382 | B1 | 5/2005 | Srinivasan et al. |
| 6,950,802 | B1 | 9/2005 | Barnes et al. |
| 7,003,560 | B1 | 2/2006 | Mullen et al. |
| 7,020,697 | B1 | 3/2006 | Goodman et al. |
| 7,051,036 | B2 | 5/2006 | Rosnow et al. |
| 7,080,351 | B1 | 7/2006 | Kirkpatrick et al. |
| 7,103,434 | B2 | 9/2006 | Chernyak et al. |
| 7,139,719 | B1 | 11/2006 | Cherneff et al. |
| 7,272,820 | B2 | 9/2007 | Klianev |
| 7,383,233 | B1 | 6/2008 | Singh et al. |
| 7,437,304 | B2 | 10/2008 | Barnard et al. |
| 7,506,053 | B1 | 3/2009 | Qin |
| 7,559,049 | B1 | 7/2009 | Hemmat et al. |
| 7,596,416 | B1 | 9/2009 | Maluf et al. |
| 7,603,653 | B2 | 10/2009 | Sundararajan et al. |
| 7,669,180 | B2 | 2/2010 | Bassin et al. |
| 7,680,682 | B2 | 3/2010 | Jessup et al. |
| 7,702,531 | B2 | 4/2010 | Draper et al. |
| 7,742,939 | B1 | 6/2010 | Pham |
| 7,752,144 | B1 | 7/2010 | Myers et al. |
| 7,849,438 | B1 | 12/2010 | Hemmat et al. |
| 7,860,736 | B2 | 12/2010 | Draper et al. |
| 7,870,535 | B2 | 1/2011 | Rippert et al. |
| 7,873,944 | B2 | 1/2011 | Bangel et al. |
| 7,885,793 | B2 | 2/2011 | Padmanabhan |
| 7,899,756 | B2 | 3/2011 | Rizzolo et al. |
| 7,921,023 | B2 | 4/2011 | Theiss et al. |
| 7,921,024 | B2 | 4/2011 | Hogan et al. |
| 7,930,201 | B1 | 4/2011 | Issa et al. |
| 7,937,281 | B2 | 5/2011 | Miller et al. |
| 7,949,997 | B2 | 5/2011 | Chessell et al. |
| 7,953,613 | B2 | 5/2011 | Gizewski |
| 7,966,328 | B2 | 6/2011 | Germeraad et al. |
| 8,032,863 | B2 | 10/2011 | Kolawa et al. |
| 8,126,768 | B2 | 2/2012 | Mehrotra et al. |
| 8,165,912 | B2 | 4/2012 | Dasika |
| 8,204,809 | B1 | 6/2012 | Wise |
| 8,225,270 | B2 | 7/2012 | Frasher et al. |
| 8,250,525 | B2 | 8/2012 | Khatutsky |
| 8,375,370 | B2 | 2/2013 | Chaar et al. |
| 8,392,999 | B2 | 3/2013 | Adar |
| 8,402,425 | B2 | 3/2013 | Deb et al. |
| 8,438,533 | B2 | 5/2013 | Fritzsche et al. |
| 8,438,560 | B2 | 5/2013 | Govindarajan et al. |
| 8,442,850 | B2 | 5/2013 | Schorr et al. |
| 8,484,065 | B1 | 7/2013 | Arredondo et al. |
| 8,494,894 | B2 | 7/2013 | Jaster et al. |
| 8,510,140 | B2 | 8/2013 | Bangs et al. |
| 8,538,797 | B2 | 9/2013 | Mishra et al. |
| 8,566,805 | B2 | 10/2013 | Bassin et al. |
| 8,639,650 | B1 | 1/2014 | Gill |
| 8,775,232 | B2 | 7/2014 | Chetwood et al. |
| 8,843,878 | B1 | 9/2014 | Grundner et al. |
| 8,869,116 | B2 | 10/2014 | Fliek et al. |
| 8,875,091 | B1 | 10/2014 | Rouleau et al. |
| 8,949,770 | B2 | 2/2015 | Stclair et al. |
| 9,461,876 | B2 | 10/2016 | Van Dusen et al. |
| 9,575,616 | B2 | 2/2017 | Linton |
| 9,576,252 | B2 | 2/2017 | Haber |
| 9,600,842 | B2 | 3/2017 | Davis et al. |
| 9,613,367 | B2 | 4/2017 | Mitra et al. |
| 9,619,363 | B1 | 4/2017 | Chitale et al. |
| 9,659,251 | B2 | 5/2017 | Tang et al. |
| 9,740,457 | B1 | 8/2017 | Liu et al. |
| 9,851,966 | B1 | 12/2017 | Barday |
| 9,892,442 | B2 | 2/2018 | Barday |
| 9,904,578 | B2 | 2/2018 | Schimpf et al. |
| 10,001,975 | B2 | 6/2018 | Bharthulwar |
| 10,248,387 | B2 | 4/2019 | Bharthulwar |
| 10,339,475 | B1 | 7/2019 | Krishnan et al. |
| 10,353,674 | B2 | 7/2019 | Barday |
| 10,409,562 | B2 * | 9/2019 | Leonelli ............... G06F 8/33 |
| 10,692,031 | B2 | 6/2020 | Carley et al. |
| 10,853,536 | B1 | 12/2020 | Steingrimsson et al. |
| 11,126,427 | B2 | 9/2021 | Sturtevant et al. |
| 11,232,383 | B1 | 1/2022 | Burns et al. |
| 2002/0059093 | A1 | 5/2002 | Barton et al. |
| 2002/0059512 | A1 | 5/2002 | Desjardins |
| 2002/0065849 | A1 | 5/2002 | Ferguson et al. |
| 2002/0111850 | A1 | 8/2002 | Smrcka et al. |
| 2002/0138317 | A1 | 9/2002 | Mok et al. |
| 2003/0009742 | A1 | 1/2003 | Bass et al. |
| 2003/0033191 | A1 | 2/2003 | Davies et al. |
| 2003/0172002 | A1 | 9/2003 | Spira et al. |
| 2003/0172368 | A1 | 9/2003 | Alumbaugh et al. |
| 2003/0225603 | A1 | 12/2003 | Skibinski |
| 2004/0002040 | A1 | 1/2004 | Foley et al. |
| 2004/0064436 | A1 | 4/2004 | Breslin et al. |
| 2004/0148047 | A1 | 7/2004 | Dismukes et al. |
| 2004/0157193 | A1 | 8/2004 | Mejias et al. |
| 2005/0114829 | A1 | 5/2005 | Robin et al. |
| 2005/0166178 | A1 | 7/2005 | Masticola et al. |
| 2006/0020500 | A1 | 1/2006 | Turner |
| 2006/0020912 | A1 | 1/2006 | Illowsky et al. |
| 2006/0165040 | A1 | 7/2006 | Rathod et al. |
| 2006/0167983 | A1 | 7/2006 | Webb |
| 2006/0173726 | A1 | 8/2006 | Hall et al. |
| 2007/0074151 | A1 | 3/2007 | Rivera et al. |
| 2007/0162316 | A1 | 7/2007 | Kratschmer et al. |
| 2008/0034347 | A1 | 2/2008 | V et al. |
| 2008/0040364 | A1 | 2/2008 | Li |
| 2008/0052146 | A1 | 2/2008 | Messinger et al. |
| 2008/0109336 | A1 | 5/2008 | Isett |
| 2008/0140469 | A1 | 6/2008 | Iqbal et al. |
| 2008/0215387 | A1 | 9/2008 | Muthusamy |
| 2008/0300946 | A1 | 12/2008 | Clark et al. |
| 2009/0006147 | A1 | 1/2009 | Padmanabhan |
| 2009/0098524 | A1 | 4/2009 | Walton |
| 2009/0138292 | A1 | 5/2009 | Dusi et al. |
| 2009/0138341 | A1 | 5/2009 | Mohan et al. |
| 2009/0228261 | A1 | 9/2009 | Chulani et al. |
| 2010/0023355 | A1 | 1/2010 | Sagalow et al. |
| 2010/0058287 | A1 * | 3/2010 | Sundararajan ............ G06F 8/71 717/104 |
| 2010/0070341 | A1 | 3/2010 | Teles et al. |
| 2010/0076863 | A1 | 3/2010 | Golomb |
| 2010/0138258 | A1 | 6/2010 | Steinbach et al. |
| 2010/0161371 | A1 | 6/2010 | Cantor et al. |
| 2012/0011077 | A1 | 1/2012 | Bhagat |
| 2012/0041796 | A1 | 2/2012 | Miller et al. |
| 2012/0244504 | A1 | 9/2012 | Wasserman |
| 2013/0066968 | A1 | 3/2013 | Ziegler |
| 2013/0159202 | A1 | 6/2013 | Darden et al. |
| 2013/0218625 | A1 | 8/2013 | Duquette et al. |
| 2013/0236877 | A1 | 9/2013 | Zhou et al. |
| 2014/0019196 | A1 | 1/2014 | Wiggins et al. |
| 2014/0181145 | A1 | 6/2014 | Kamsamohideen |
| 2014/0195297 | A1 | 7/2014 | Abuelsaad et al. |
| 2015/0046369 | A1 | 2/2015 | Taylor et al. |
| 2015/0134398 | A1 | 5/2015 | Xiao |
| 2016/0071032 | A1 | 3/2016 | Hunter |
| 2016/0154962 | A1 | 6/2016 | Nuez |
| 2016/0321583 | A1 | 11/2016 | Jones et al. |
| 2017/0053244 | A1 | 2/2017 | Khalil |
| 2019/0213551 | A1 | 7/2019 | Zhou et al. |

(56) References Cited

U.S. PATENT DOCUMENTS

| | | |
|---|---|---|
| 2019/0220936 A1 | 7/2019 | Khalil |
| 2019/0318222 A1 | 10/2019 | Mallela |
| 2021/0027645 A1 | 1/2021 | Nicol |
| 2021/0042662 A1 | 2/2021 | Pu et al. |
| 2022/0188220 A1* | 6/2022 | Shailendra .......... G06F 11/3688 |

FOREIGN PATENT DOCUMENTS

| | | |
|---|---|---|
| EP | 1250669 A1 | 10/2002 |
| EP | 2635997 A2 | 9/2013 |
| KR | 20060068162 A | 6/2006 |
| KR | 100923407 B1 | 10/2009 |
| KR | 101429215 B1 | 9/2014 |
| KR | 101945800 B1 | 2/2019 |
| WO | 2020123993 A2 | 6/2020 |
| WO | 2020148479 A1 | 7/2020 |
| WO | 2021126012 A1 | 6/2021 |

\* cited by examiner

| Sq3 | Capability | Capability Detail | Features Impacted | Oracle Impact | Product | DFS Hours | Oracle Hours | Assumptions | Dependency | Sequence | Total LOE | # of Sprints | OVH Cost E2E+UAT+FCT |
|---|---|---|---|---|---|---|---|---|---|---|---|---|---|
| 1 | C1 | CD1 | F1 | No | EIP | 1,000 | | Capture Feature Assumptions | DFS | 1 | 1,600 | 2 3/4 | $45,600 |
| 2 | C2 | CD2 | F2 | Yes | EIP | 1,000 | 200 | Capture Feature Assumptions | DFS, Oracle | 2 | 1,800 | 2 3/4 | $66,600 |
| 3 | C3 | CD3 | F3 | No | EIP | 100 | | Capture Feature Assumptions | DFS | 3 | 160 | 1/4 | $4,560 |
| 4 | C4 | CD4 | F4 | No | EIP | 100 | | Capture Feature Assumptions | DFS | 4 | 160 | 1/4 | $4,560 |
| | TOTAL | | | | | 2,200 | 200 | | | | 3,720 | 6.1 | $121,320 |

Cost Summary

| Group/Domain | Cost | | Apr 2020 | May 2020 | Jun 2020 | Jul 2020 | Aug 2020 | Sep 2020 | Oct 2020 | Nov 2020 | Dec 2020 | |
|---|---|---|---|---|---|---|---|---|---|---|---|---|
| DFS | $334,400 | | $33,440 | | $250,800 | $41,800 | $8,360 | | | | | 100% |
| Oracle | $70,000 | | $7,000 | $63,000 | | | | | | | | 100% |
| DFS+Oracle Total | $404,400 | | $40,440 | $63,000 | $250,800 | $41,800 | $8,360 | | | | | |
| E2E | $40,440 | | | | $40,440 | | | | | | | 100% |
| UAT | $40,440 | | | | $40,440 | | | | | | | 100% |
| FCT | $40,440 | | | | $20,220 | $20,220 | | | | | | 100% |
| Overheads Total | $121,320 | | | | $101,100 | $20,220 | | | | | | |
| DFS Grand Total | $535,720 | | $40,440 | $63,000 | $250,800 | $142,900 | $28,580 | | | | | 100% |
| Other Domains Total | | | | | | | | | | | | |
| Grand Total | $525,720 | | $40,440 | $63,000 | $250,800 | $142,900 | $28,580 | | | | | 100% |

LOE Summary

| Group/Domain | Cost | | Apr 2020 | May 2020 | Jun 2020 | Jul 2020 | Aug 2020 | Sep 2020 | Oct 2020 | Nov 2020 | Dec 2020 | |
|---|---|---|---|---|---|---|---|---|---|---|---|---|
| DFS | 3,520 | | 352 | | 2,640 | 440 | 88 | | | | | 100% |
| Oracle | 200 | | 20 | 180 | | | | | | | | 100% |
| DFS Total | 3,720 | | 372 | 180 | 2,640 | 440 | 88 | | | | | 100% |

Timelines | Refresh

| Features Impacted | No. of Sprints | Sequence | Apr 2020 | May 2020 | Jun 2020 | Jul 2020 | Aug 2020 | Sep 2020 | Oct 2020 | Nov 2020 | Dec 2020 |
|---|---|---|---|---|---|---|---|---|---|---|---|
| F1 | 2 3/4 | 1 | REQ | Oracle | DFS: ST1 | E2E/UAT | | | | | |
| F2 | 2 3/4 | 2 | REQ | Oracle | DFS: ST1 | E2E/UAT | | | | | |
| F3 | 1/4 | 3 | REQ | Oracle | DFS: ST2 | E2E/UAT | | | | | |
| F4 | 1/4 | 4 | REQ | Oracle | DFS: ST2 | E2E/UAT | | | | | |
| Other Domains | 6.1 | | | Accounting, EDS, Reporting and REV App | | | FCT:DFS Support:ST-1,2,3 | | | | Launch |

Project Summary

| Month to Month Billing | |
|---|---|
| Duration (Months) | 5 |
| Number of Sprints | 6.1 |
| LOE (Hours) | 3,720 |
| Cost | $525,720 |

*FIG. 3*

CENTRALIZED INTAKE AND CAPACITY ASSESSMENT PLATFORM FOR PROJECT PROCESSES, SUCH AS WITH PRODUCT DEVELOPMENT IN TELECOMMUNICATIONS

BACKGROUND

The telecommunications industry continues to evolve, as networks become more complicated and technologies advance rapidly. To compete for more subscribers, network carriers seek to lower service charges, improve subscriber services, and reduce maintenance costs. To satisfy subscriber demands for high quality communications, network carriers design and test new products to ensure that they satisfy rigorous standards and provide reliable performance. Developing a new product involves initial ideation, research, and prototyping, before launching. The product development process can have multiple phases that involve resources (e.g., software and hardware tools) and teams of people to advance a product from concept to launch. An initial phase of the product development process begins by generating product ideas that consider factors such as functionality. Later phases involve feature definition, prototyping, design, testing, and commercialization.

As technology advances, software environments become more complex and development becomes more challenging. For example, applications, systems, and communications networks are constantly under various security attacks such as malicious code or denial of service. A security development lifecycle (SDL) introduces security and privacy considerations throughout all phases of the development process, helping developers build highly secure software products, address security compliance requirements, and reduce development costs. The guidance, best practices, tools, and processes in the SDL are used to build more secure products and services. Building reliable and secure software is not only the responsibility of engineers but also the responsibility of the stakeholders which include management, project managers, business analysts, quality assurance managers, technical architects, security specialists, application owners, and developers.

BRIEF DESCRIPTION OF THE DRAWINGS

Detailed descriptions of implementations of the present invention will be described and explained through the use of the accompanying drawings.

FIG. 3 illustrates an assessment template of the INCAR platform.

Figure 1:
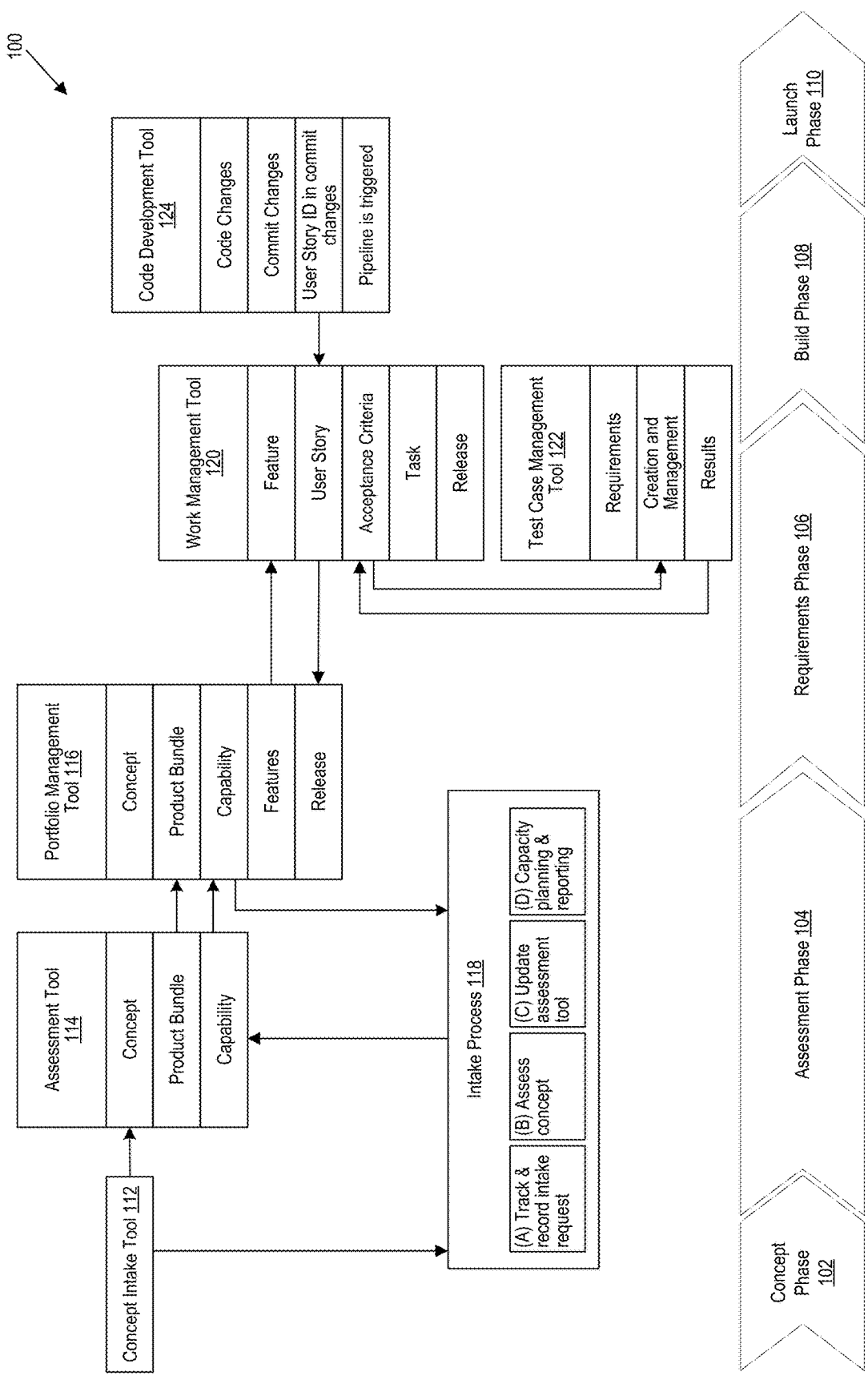
FIG. 1 is a block diagram that illustrates a product development process.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a centralized platform for real-time intake and capacity assessment in product development projects, which is particularly useful in the telecommunications industry that requires continuous design and development of new products for improved subscriber experience. In addition, evolving technical standards in the telecommunications industry require dynamic optimization and reprioritization of product development to manage costs and reduce time to launch. The disclosed platform (also referred to herein as INCAR ("intake capacity assessment real-time")) is configured to intake and process product data regarding a concept and estimate capacity requirements to dynamically adapt to changes while ensuring on-time delivery within predefined constraints. The capacity can refer to an amount or level of effort (LOE) required to deliver a capability/feature of a product. The capability can refer to an ability to complete a job for the product.

The platform provides a streamlined assessment and capacity pipeline for product development that involves multiple successive phases of an end-to-end process from concept to launch. The successive phases include concept, assessment, functional requirements, build, and launch of a product development process (also referred to herein as the "CARBL" process). The platform operates as a unitary portal that ties together tools including hardware and software modules that would be otherwise utilized separately across phases without a common way to manage and dynamically adapt product development.

The platform includes an online intake datastore for data items that define product development processes (e.g., projects) including truth data, which includes data indicative of LOEs, cost, and other key elements that constitute a single source or truth. In one example, the truth data can be used for machine learning and optimization based on adaptive learning based on product development processes of similar products or iterative designs or versions of already released products. For example, the platform can maintain a machine learning model that intakes concept information for a new product that is compared against existing products to predict capability requirements for the new product development process. The capabilities can include features such as resources such as computing resources and human resources required to bring a concept to launch, and a knowledgebase regarding features for products (e.g., security or function features).

Components of the platform that are central to providing unified visibility and management across the CARBL process include an electronic service desk, an assessment platform, and a dashboards portal. The service desk is a single point of contact between the INCAR platform and participants or groups of participants in the CARBL process. The service desk can manage intake requests and handle communications with participants. For example, the service desk receives submissions for requests to assess a concept and operates as a unified portal for managing lifecycles of intake and tracking in each of the multiple successive phases. The assessment template is a sample form that includes some details and formulas in cells to calculate data for assessing the development of the product. For example, the assessment template can include data and formulas for predicting a capacity requirement to take a product from concept to launch. Lastly, the dashboards include visualizations that enable better decision-making, planning, and prioritization.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 is a block diagram that illustrates a product development process 100. The process 100 includes an end-to-end system of modules that span successive phases. An example of a module is a computer tool such as software operating on hardware. The process 100 has CARBL phases including a concept phase 102, an assessment phase 104, a requirements phase 106, a build phase 108, and a launch phase 110. The concept phase 102 includes a concept intake tool 112 configured to intake data for assessing an idea from concept to launch (referred to herein as a "project"). An example of the data is an email message including a request for assessment of a described concept. The email can include details describing the project in a plaintext format or other unstructured data that specifies a concept, features, specification, requirements, and/or constraints. In another example, an electronic message includes structured data in a form having areas for a submitter to populate as part of a request.

The assessment phase 104 can include an assessment tool 114 configured to process the concept and related data input to the concept intake tool 112. For example, the assessment tool 114 can process data of the request to analyze a product bundle (e.g., multiple products) and determine the capability of resources to take the concept to launch. Examples of resources include machine resources (e.g., computing) and human resources based on existing structures for completing development and production of a product. At the assessment phase 104 and leading into the requirements phase 106, a portfolio management tool manages the product bundle and capability output by the assessment tool 114. The portfolio management tool 116 manages features and release of the product.

An intake process 118 includes multiple sources of information exchanged during the assessment phase 104. For example, the intake process 118 can receive information from the concept intake tool 112, communicate other information (e.g., LOEs) back to the assessment tool 114, and receive feedback about, for example, capability information from the portfolio management tool 116. The sources of intake information include sources of information related to tracking and recording the intake request, assessment information for the concept, updates for the assessment tool, and capacity planning and reporting. The intake process 118 can communicate manually. For example, the submitter can manually update cost and LOE information for capability information to the assessment tool 114.

The requirements phase 106 continues with the work management tool 120, which receives the feature output of the portfolio management tool 116. The work management tool 120 outputs a user story and defines acceptance criteria, which is exchanged with a test case management tool 122 including requirements, creation and management, and results of test cases used to assess whether the product satisfies functional requirements for the product. In software development and product management, the "user story" refers to an informal, natural language description of features of a software system. A user story can be written from the perspective of an end user or user of a system.

A build phase 108 follows the requirements phase 106, and lastly a launch phase 110 concludes the process 100. The transition from the requirements phase 106 to the build phase 108 includes a code development tool 124. The code development tool 120 includes code changes, commit changes, where a user story ID is included in a commit message, and a pipeline is triggered. In one example, the pipeline refers to the process flow in software development to commit code to a code repository.

The INCAR platform improves over the process 100 by aggregating data of projects (e.g., LOEs). The platform also centralizes reporting to drive decision-making for dynamic planning and project prioritization, mitigates overloading resources due to changes or additional projects, to provide on-time delivery. In addition, INCAR mitigates the risk of running over budget and over capacity.

Figure 2:
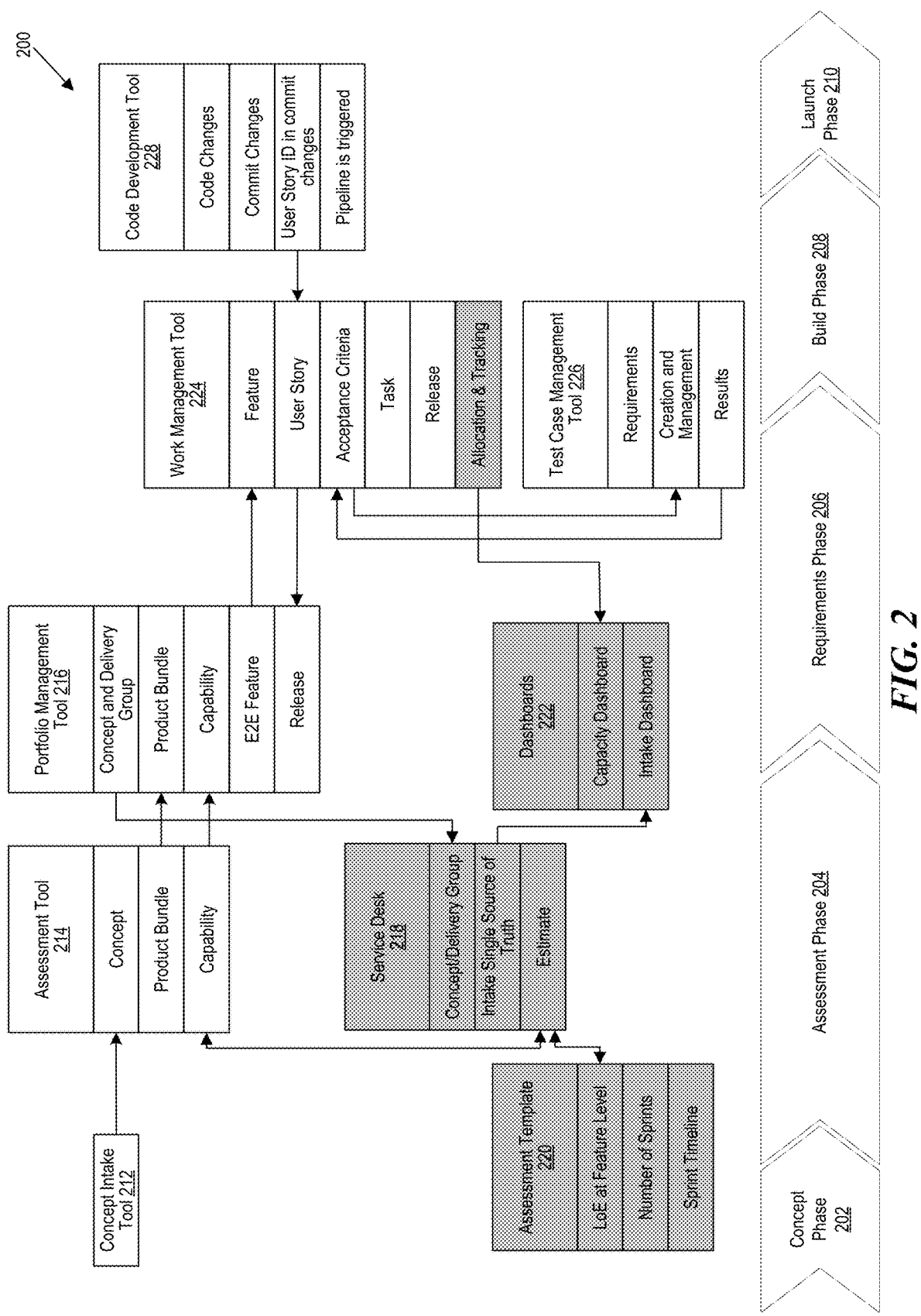
FIG. 2 is a block diagram that illustrates a product development process including additional intake capacity assessment real-time (INCAR) platform components.

For example, FIG. 2 is a block diagram that illustrates a product development process 200 including additional INCAR components. The INCAR components enable capturing, assessing, and tracking projects, as well as associated capabilities and domains, to provide continuous and real-time data for project improvement and to dynamically adapt to changes in a particular project or to reprioritize projects. The phases of the process 200 include a concept phase 202, an assessment phase 204, a requirements phase 206, a build phase 208, and a launch phase 210. The concept phase 202 includes a concept intake tool 212 that can receive intake data for assessing a concept. An example of the intake data is an email message including a request to assess a concept. The email message can include a description of a project in a plaintext format or other unstructured format that specifies a concept, features, specification, requirements, and/or constraints. In another example, an email message includes structured data such as a form that a submitter completed.

The assessment phase 204 includes an assessment tool 214 that can process parts of the request message to, for example, analyze a product bundle and determine the capability for resources required to take the concept to launch. Examples of resources again are machine and human resources, including existing structures for development and production of a product. At the assessment phase 204 and leading into the requirements phase 206, a portfolio management tool manages the product bundle and capability output by the assessment tool 214. The portfolio management tool 216 manages features and the release version of the product.

The additional components for the INCAR platform include a service desk 218, an assessment template 220, and dashboards 222 that are operable for the assessment phase 204 as well as other phases of the multiple successive phases of the CARBL process. The service desk 218 provides a centralized intake store that operates as a unified portal for managing the lifecycle of the process 200. Moreover, the service desk 218 enables tracking service level agreements for each phase of the process 200. As illustrated, the service desk 218 can receive information from a concept and delivery group of the portfolio management tool 216. The service desk 218 also provides an intake single source of truth data that can be used to generate estimates. The assessment template 220 is a structured template for feature-level data including a timeline with number of sprint cycles, and periodic capacity (e.g., monthly) or cost allocations. As such, the assessment template 220 can enable better planning and prioritization of projects based on a timeline and cost. A "sprint cycle" refers to a timeboxed period when a group delivers a set amount of work. For example, it can be two weeks in duration, where each sprint starts the moment the previous sprint is completed. The sprint cycle can be referred to as a process of continuous development.

The dashboards 222 can provide visualizations for tracking a project at any or each phase of the process 200. For example, the truth data can be fed to the intake dashboard to display the status of projects as visualizations. In one implementation, the dashboards 222 are auto generated to provide improved visualizations for project milestones and key performance indicators (KPIs), for example. As a result, the platform provides a centralized intake and management capacity management platform that enables better decision-making, planning, and prioritization. For example, the platform can provide capacity management including data-driven decision-making to drive prioritization, capacity planning, onboarding, and budgeting. This, in addition to prioritizing the scope of a minimum viable product (MVP), timeline and budget, as well as help track for capacities at different phases.

The platform can manage datasets that can vary from project-to-project and among projects to improve the efficiency of an assessment and handle switching to pause and resume projects while reducing performance interruptions. The datasets can include pre-assessments, emails, policies or initiatives, production gaps, and non-functional requirement (NFR) gaps. The datasets can be routed to the service desk 218, which receives assessment requests based on the assessment template 220 and outputs visualizations on the dashboards 222 regarding intake and capacity, to provide process optimization through automation and a streamlined pipeline. Thus, the pipeline of the process 200 can handle dynamic reprioritization, delivery, capacity planning, and planning and management for product release.

FIG. 3 illustrates an example of an assessment template 300. The template 300 is shown as a spreadsheet including cells for feature-level data that breaks down a project into a sequence of capabilities, impacted features, and estimates for completing the work, as well as feature-level assumptions. The data is used to automatically generate a total LOE, number of sprints, and costs. The template 300 can have data in cells that are added or completed, removed or changed either input manually or through an automated iterative process, such as with a software assistant or with machine learning. The template 300 enables the ability to bypass the initial setup and configuration time necessary to create standardized documents. The template 300 enables automatic configuration with features such as autocompletion, toolbars, and other options.

The template 300 also includes sections for a cost summary, LOE summary, timelines, and project sample. This data provides visibility into the progression of the development of the project to understand whether any changes need to be made, including how to prioritize certain products relative to others. The cost summary is broken down by group or domain, which refers to the tools (e.g., hardware, software, team) responsible for delivering a feature on a monthly basis. The LOE summary is also broken down on a per month basis, and the timeline shows a number of sprints on a feature-level and on a monthly basis. Lastly, the project summary provides totals for month-to-month billings. Hence, the template 300 can improve capacity planning and work prioritization.

The automated dashboards provide visualizations and tracking of each phase of the CARBL process. As used herein, a "dashboard" can refer to a type of graphical user interface (GUI) which can provide at-a-glance views of KPIs to track progression of a project. Hence, a dashboard can provide a progress report and data visualizations. A dashboard can be often accessible by a web browser and is linked to regularly updating data sources to provide real-time visualizations and analytics. Examples of the automated dashboards include intake and capacity visualizations, an automated capacity-LOE view, and a complete domain automated capacity view.

Figure 4A:
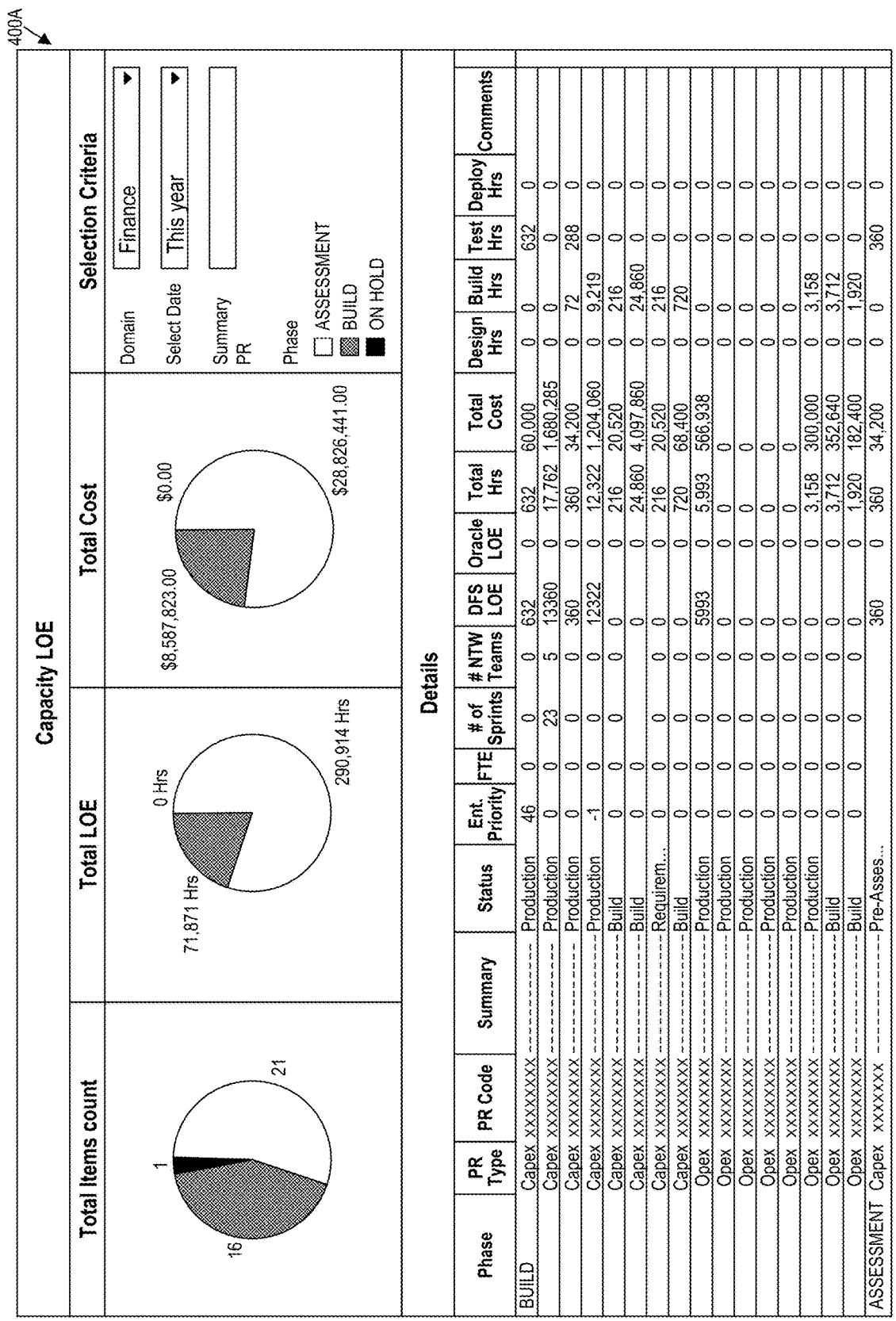
FIG. 4A illustrates a capacity dashboard of the INCAR platform.
Figure 4B:
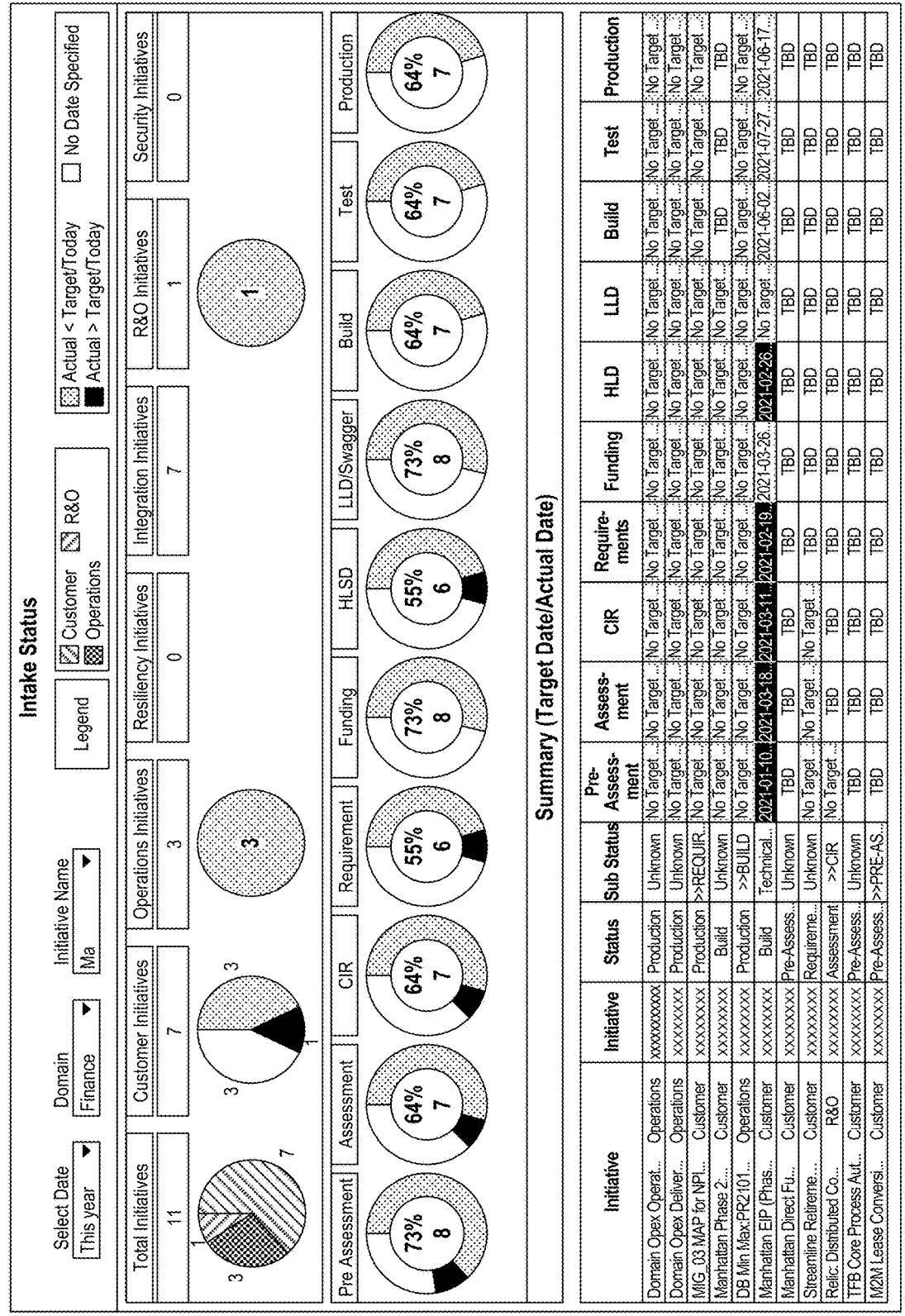
FIG. 4B illustrates an intake dashboard of the INCAR platform.
Figure 4C:
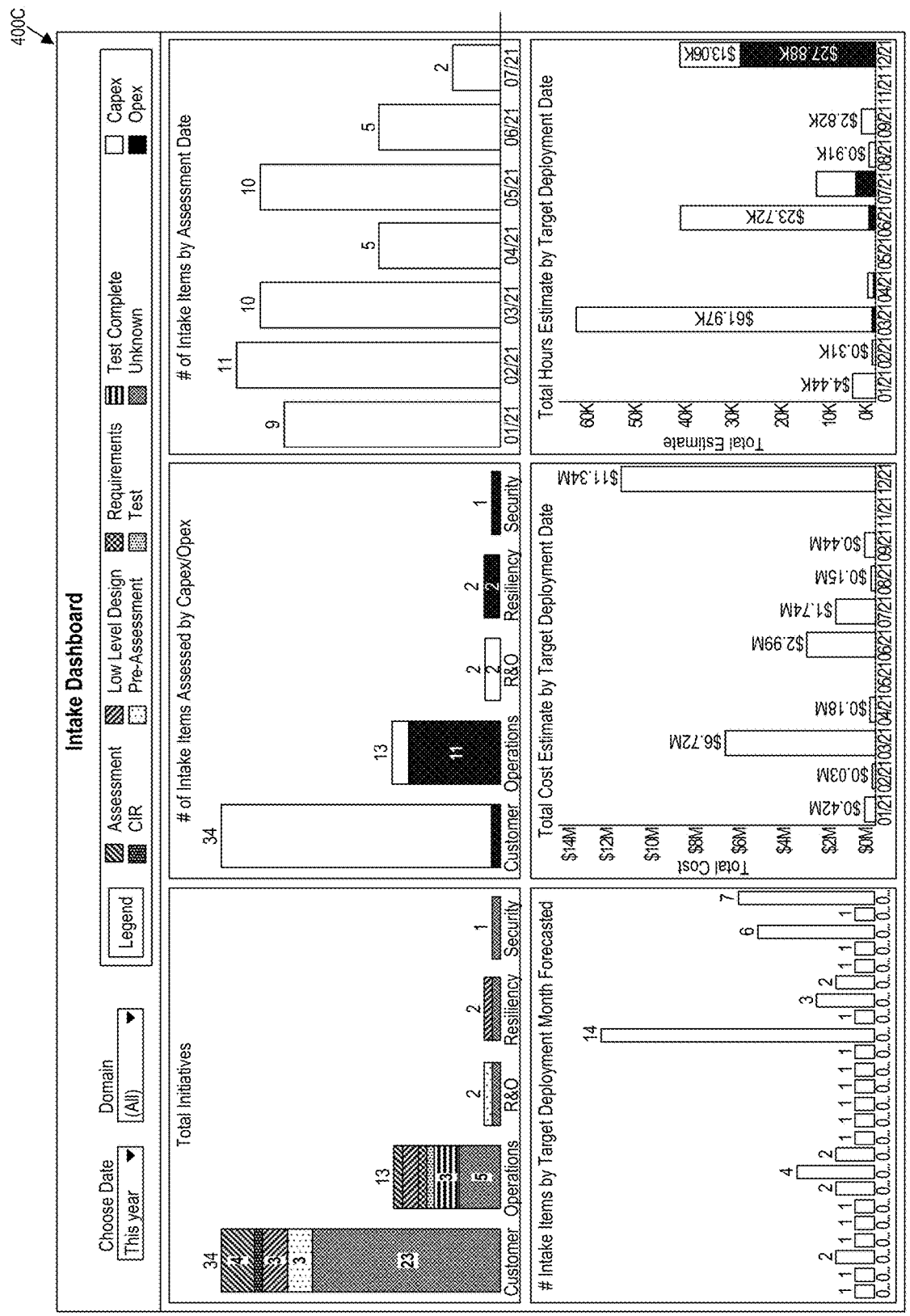
FIG. 4C illustrates another intake dashboard of the INCAR platform.

FIGS. 4A through 4C illustrate dashboards generated by the platform. Specifically, FIG. 4A illustrates an example of a capacity dashboard 400A. The capacity dashboard 400A enables data driven decisions to drive prioritization, capacity planning, onboarding, and budgeting. The visualizations include total items count, total LOE, total cost, and selection criteria for customizing the visualizations. The dashboard 400A also includes details of datasets used for generating the visualizations. FIG. 4B illustrates an intake dashboard 400B that includes several visualizations for, among other things, initiatives and status of assessments, testing, and production. The status data is visualized to show actual progress relative to planned progress. In addition, the data that is the basis for the visualizations is shown as details in a separate section. FIG. 4C illustrates another intake dashboard 400C including visualizations that show the status of intake items, assessed items, dates of assessments, deployment forecasts, cost estimates, and target hours to deployment data.

Referring back to FIG. 2, the requirements phase 206 then continues to the work management tool 224, which receives the feature output of the portfolio management tool 216. The work management tool 224 outputs a user story as a release and defines acceptance criteria, which is exchanged with a test case management tool 226. In addition, the work management tool 224 provides allocation and tracking data for a capacity dashboard of the dashboards 222. The test case management tool 226 sets functional requirements, creation and management of test cases, and generates test results of the test cases, which are used to assess whether the project satisfies functional requirements.

The build phase 208 follows the requirements phase 206, and lastly a launch phase 210 concludes the process 200. The transition from the requirements phase 206 to the build phase 208 includes a code development tool 228. The code development tool 228 manages code changes, and commits the changes, where a user story identifier is included in commit message, and a pipeline is triggered.

Figure 5:
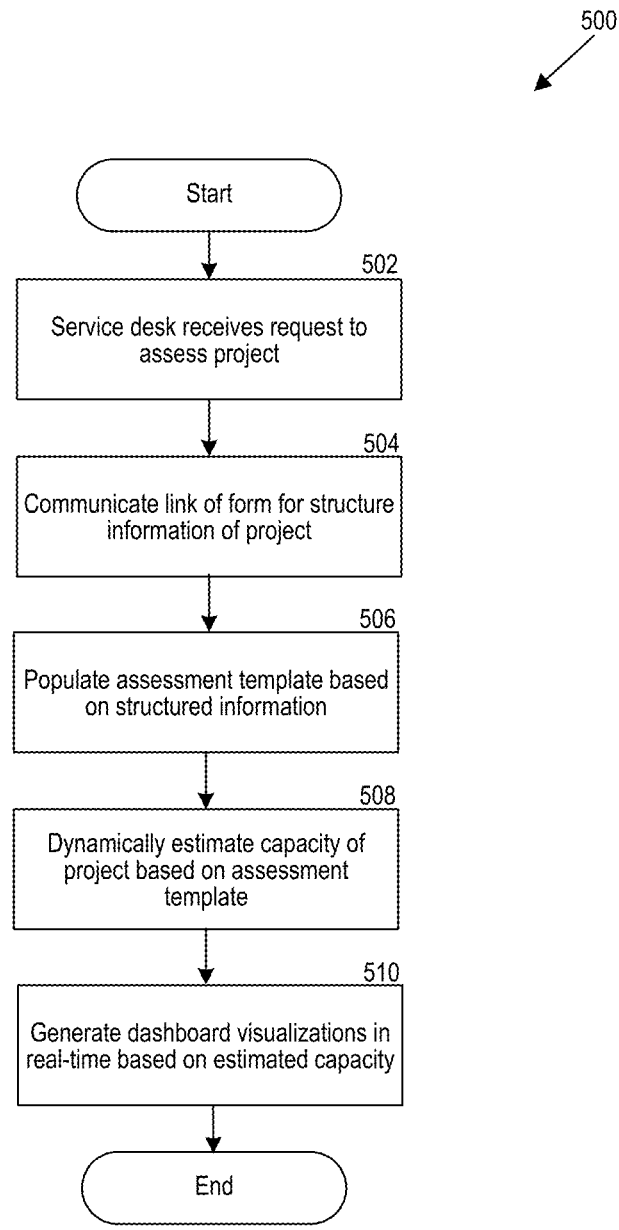
FIG. 5 is a flowchart that illustrates a process of the INCAR platform.

FIG. 5 is a flowchart that illustrates a process of the INCAR platform. The process 500 can be performed to track the progress of a project. At 502, a service desk receives a request to assess a project. For example, an email message can be routed to the service desk, where the message includes a request to assess development of a software product for a telecommunications network in accordance with a process having multiple successive phases. The multiple successive phases can include a concept phase, an assessment phase, a requirements phase, a build phase, and a launch phase. As such, the platform can monitor each of the multiple successive phases in real-time.

The request can be submitted to the system by a submitter that belongs to a group (e.g., domain). The service desk can include a source of truth data for assessing the development of the software product. In one example, a concept intake tool can receive as input an indication of a concept for a software product and convert the input into a standard format for an assessment tool. In another example, the system can perform code development of the software product as part of the multiple successive phases, where code changes that are committed are associated with a unique identifier of the submitter or project.

At 504, in response to the request, an electronic message (e.g., email) is communicated to an electronic device for display to the submitter. The electronic message includes a link to a form configured to receive structured information including a name for the project, contact information for the submitter or a group to which the submitter belongs (e.g., a domain), an objective of the assessment, one or more requirements for the project, a type of assessment, one or more scopes for the project, names or identifying information for participants of the project, a target launch date, LOEs notes, attachments, etc.

In one example, the platform can retrieve capacity information from the assessment tool, which can transform concept information into product-level information. As such, a capacity measure is based on the capacity information.

At 506, an assessment template is populated based on structured information. For example, the assessment template can include information from the form completed by the submitter or can be populated by a product owner along with developers, data architects and QA analysts, to include LOE for each of capability or feature. The assessment template includes feature-level information of the software product including LOE. In one example, an assessment tool is configured to receive as input an indication the software product based on an initial description of a concept. The platform can then assess a product bundle for the software product and the capability measure for the product. In one example, a portfolio management tool configured to manage a process from concept to delivery of the software product. The process can include a product bundle, capability measure, feature-level information of the product, and a release data.

At 508, the platform can dynamically estimate a capacity measure for the project relative to the truth data based on the populated assessment template and a current phase of the multiple successive phases in, for example, the development of the software product. The system can estimate the capacity measure for the feature-level information based on the truth data to advance the project. In one example, the capacity measure relates to resource utilization based on the LOE.

In the example where the project includes product development of a software program, the platform includes a code development tool that can perform code development of the product as part of the process and commit code changes as part of the code development and in association with an identifier for the user story. In one example, a test case management tool can create a test case based on a requirement for the product and output a result based on requirements for acceptance criteria for the project.

At 510, the platform can auto generate visualizations on dashboards displayed on a GUI. A visualization can be based on an estimate of a capacity measure. In another example, another visualization indicates an allocation of a resource and progression of the development of the project. Specifically, visualizations can be based on information of the allocation and progression of the project as received in real-time from the work management tool configured to analyze the feature-level information of the product.

The platform can connect with components to provide visualizations in real-time. For example, the platform can perform a test case of the project based on a requirement for a software product. The test case can be created and managed by a test case management tool. As such, a visualization output on a dashboard can be based on a result of the test case. The work management tool can allocate resources for the project based on feature-level information, and track progression of the development of the software product in real-time, where the progression is available for visualization of the dashboard.

The platform can also dynamically update its outputs based on new projects or a change in project plans. For example, the platform can reprioritize the project to delay for another project. As such, the platform can update the estimate of the capacity in response to the delay of the project and update the visualization based on the updated estimate of the capacity measure.

Computer System

Figure 6:
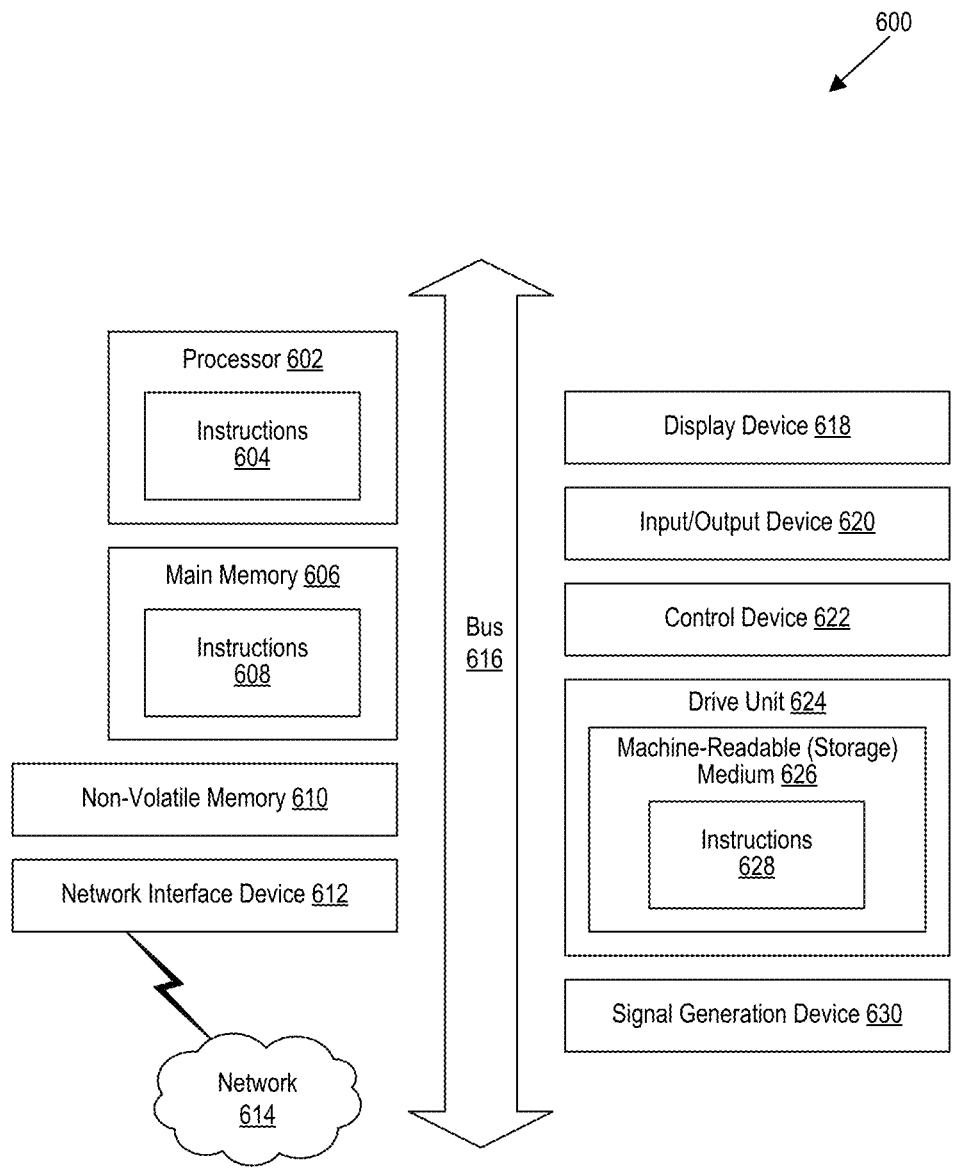
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A system configured to provide real-time intake capacity assessment of a software product for a telecommunications network, the system comprising:
   at least one hardware processor; and
   at least one non-transitory memory storing instructions, which, when executed by the at least one hardware processor, cause the system to:
   route, to a service desk of the system, a request to assess capacity for development of a software product for the telecommunications network in accordance with a process having multiple successive phases,
      wherein the request is submitted to the system by a submitter, and
      wherein the service desk includes a source of truth data for assessing capacity for the development of the software product;
   in response to the request, communicate an electronic message to an electronic device for display to the submitter,
      wherein the electronic message includes a link to a form configured to receive structured information including an indication of the submitter or a group to which the submitter belongs, an objective of the assessment, and a requirement for the software product;
   populate an assessment template based on the structured information or information input by a user designated as an owner of the software product,
      wherein the assessment template includes feature-level information of the software product including level-of-effort (LOE) for each feature;
   dynamically estimate a capacity measure for the software product based on the truth data, the populated assessment template and a current phase of the multiple successive phases for the software product; and
   generate a first visualization on one of multiple dashboards displayed on a user interface on a display device,
      wherein the first visualization is based on the estimate of the capacity measure,
      wherein the first visualization enables real-time tracking of the capacity measure at a phase of the multiple successive leases of the process, and
      wherein the first visualization is updated dynamically based on the real-time tracking of the capacity measure.

2. The system of claim 1, wherein to dynamically estimate the capacity measure comprises causing the system to:
   estimate the capacity measure for the feature-level information based on the truth data to advance the development of the software product,
      wherein the capacity measure relates to resource utilization based on the LOE.

3. The system of claim 1 further caused to retrieve capability information from an assessment tool of the system, wherein the assessment tool is configured to:
   transform concept information into product-level information of the software product,
      wherein the capacity measure is based on the capability information.

4. The system of claim 1 further caused to:
   output a second visualization on a dashboard,
      wherein the second visualization indicates an allocation of a resource and progression of the development of the software product, and
      wherein information of the allocation and the progression of the development of the software product is received from a work management tool configured to analyze the feature-level information of the software product.

5. The system of claim 1 further caused to:
   perform a test case of the software product based on a requirement for the software product,
      wherein the test case is created and managed by a test case management tool of the system; and
   output a second visualization on a dashboard based on a result of the test case.

6. The system of claim 1 further caused to:
   perform code development of the software product as part of the multiple successive phases,
      wherein code changes that are committed are associated with a unique identifier.

7. The system of claim 1 comprising a concept intake tool configured to:
   receive as input an indication of a concept for the software product; and
   convert the input into a standard format for an assessment tool of the system.

8. The system of claim 1 comprising an assessment tool configured to:
   receive as input an indication of the software product based on an initial description of a concept; and
   assess a product bundle for the software product and the capacity measure for the software product.

9. The system of claim 1 comprising a portfolio management tool configured to:
   manage a process from concept to delivery of the software product,
      wherein the process includes a product bundle, capability measure, feature-level information of the software product, and release information.

10. The system of claim 1 comprising a work management tool configured to:
    allocate resources for the software product based on feature-level information of the software product; and
    track progression of the development of the software product in real-time,
       wherein an indication of the progression of the development is available for the multiple dashboards.

11. The system of claim 1 comprising a test case management tool configured to:
    create a test case based on a requirement for the software product; and
    output a result based on acceptance criteria for the software product.

12. The system of claim 1 comprising a code development tool configured to:

perform code development of the software product as part of the process; and commit code changes as part of the code development and in association with an identifier for a user story of the software product.

13. The system of claim 1, wherein the multiple successive phases include a concept phase, an assessment phase, a requirements phase, a build phase, and a launch phase, and wherein the system is configured to:

enable monitoring each of the multiple successive phases in real-time.

14. A computer-readable storage medium, excluding transitory signals and carrying instructions, which, when executed by at least one data processor of a system, cause the system to:

receive, at a service desk of the system, a request having structured information including an indication of a submitter or a group to which the submitter belongs, an objective of an assessment, and a requirement for the assessment,
wherein the request is to assess capacity for development of a product in accordance with a process having multiple successive phases, and
wherein the service desk includes a source of truth data for assessing the product at any phase of the multiple successive phases;

populate an assessment template based on the structured information,
wherein the assessment template includes feature-level information including a level-of-effort (LOE) for the product;

dynamically assess a capacity of the system to advance the development of the product through the multiple successive phases based on the populated assessment template and a current phase; and generate a visualization on a dashboard on a user interface on a display device, wherein the visualization is based on the capacity of the system,
wherein the visualization enables real-time tracking of the capacity of the system at a phase of the multiple successive phases of the process, and
wherein the visualization is updated dynamically based on the real-time tracking of the capacity.

15. The computer-readable storage medium of claim 14, wherein the system comprises a concept intake module configured to:

receive as input an indication of a concept for the product; and convert the input into a standard format for an assessment tool.

16. The computer-readable storage medium of claim 14, wherein the system comprises an assessment tool configured to:

receive as input an indication the product based on an initial description of a concept; and assess a product bundle for the product and the capacity for the product.

17. The computer-readable storage medium of claim 14, wherein the system comprises a portfolio management tool configured to:

manage a process from concept to delivery of the product, wherein the process includes a product bundle, capability measure, feature-level information of the product, and a release data.

18. The computer-readable storage medium of claim 14, wherein the system comprises a work management tool configured to:

allocate resources for the product based on feature-level information of the product; and track progression of the development of the product in real-time,
wherein an indication of the progression of the development is available for the dashboard.

19. A method for real-time intake capacity assessment of a project for a telecommunications network, the method comprising:

routing, to a service desk, a request to assess the project for the telecommunications network,
wherein the project is scheduled in accordance with multiple successive phases of a process, and
wherein the service desk includes truth data for assessing a status of the project;

in response to the request, communicating an electronic message to an electronic device for display to a submitter of the request,
wherein the electronic message includes a link to a form configured to receive structured information including an indication of the submitter, an objective of an assessment, and a requirement for the project;

populating an assessment template based on the structured information,
wherein the assessment template includes feature-level information of the project including a level-of-effort (LOE);

dynamically estimating a capacity measure for the project relative to the truth data based on the populated assessment template relative to a current phase of the multiple successive phases of the process; and generating a visualization on a dashboard displayed on a user interface on a display device,
wherein the visualization is based on the estimate of the capacity measure,
wherein the visualization enables real-time tracking of the capacity measure at a phase of the multiple successive phases of the process, and
wherein the visualization is updated dynamically based on the real-time tracking of the capacity measure.

20. The method of claim 19 further comprising:

reprioritizing the project to delay for another project;

updating the estimate of the capacity measure in response to the delay of the project; and updating the visualization based on the updated estimate of the capacity measure.

* * * * *